Jan. 8, 1946.  E. C. HORTON  2,392,670
WINDSHIELD CLEANER
Filed Sept. 17, 1942
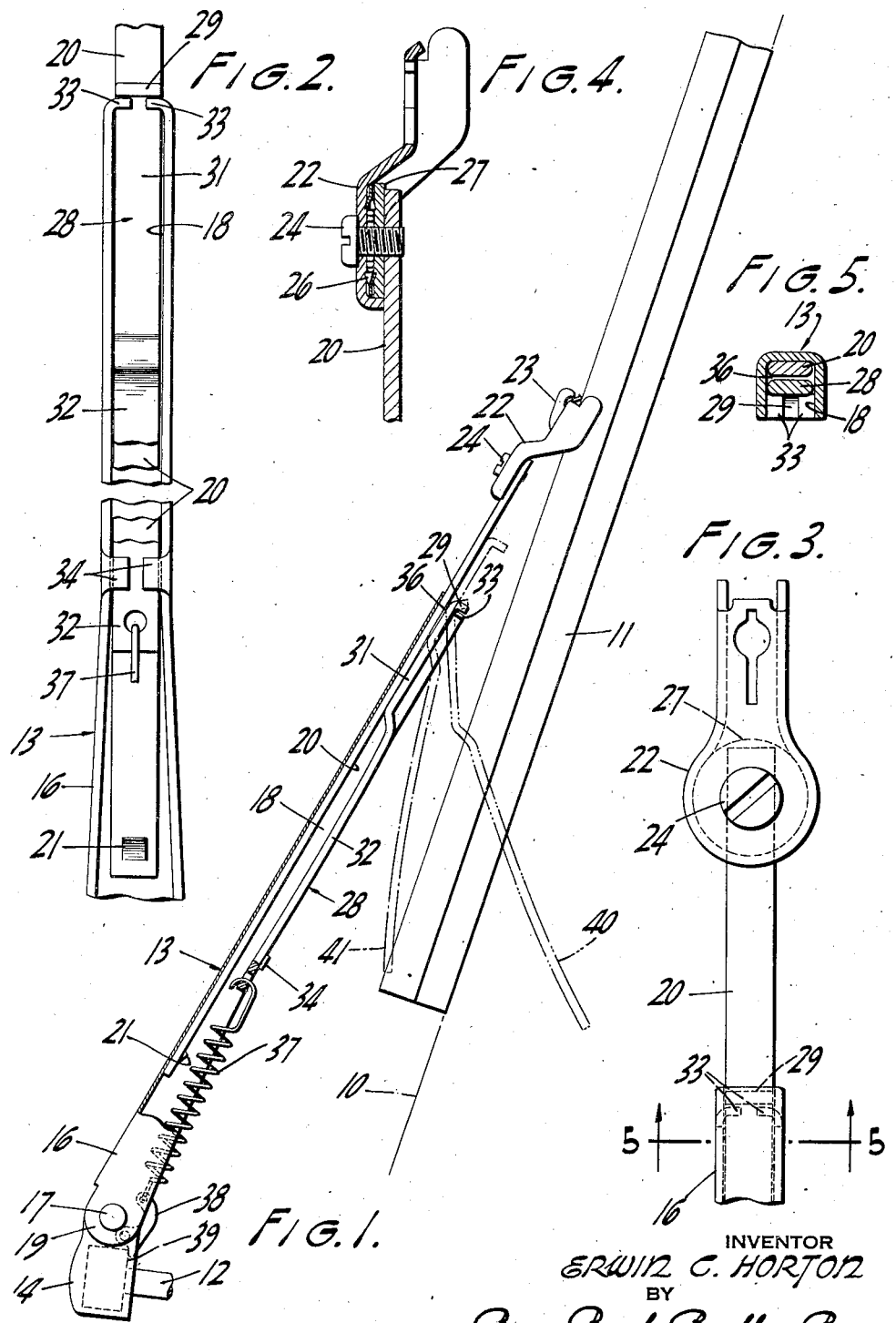
INVENTOR
ERWIN C. HORTON
BY
Bean, Brooks, Buckley & Bean
ATTORNEYS Patented Jan. 8, 1946

2,392,670

UNITED STATES PATENT OFFICE 2,392,670

WINDSHIELD CLEANER

Erwin C. Horton, Hamburg, N. Y., assignor to Trico Products Corporation, Buffalo, N. Y.

Application September 17, 1942, Serial No. 458,629

11 Claims. (Cl. 15—255)

This invention relates to the windshield cleaner art and more particularly to the wiper carrying arm.

The object of this invention is to provide a wiper arm of simplified and rugged construction adapted to efficiently operate wipers on windshields of various shapes and dimensions and, further, to provide a wiper carrying arm lending itself to quick adjustments and economical manufacture.

In the drawing:

Fig. 1 is a side elevational view, partly in section, of the improved wiper arm in an operative position;

Fig. 2 is a fragmentary bottom plan view of the wiper arm;

Fig. 3 is a top plan view of the wiper engaging element of the arm;

Fig. 4 is a longitudinal section of the wiper engaging element, and

Fig. 5 is a sectional view taken along line 5—5 of Fig. 3.

Referring more particularly to the drawing, the numeral 10 designates the windshield of a motor vehicle, 11 the wiper blade thereon and 12 the oscillatory actuating shaft upon which the wiper blade carrying arm 13 is mounted.

The wiper carrying arm 13 comprises an inner section 14 adapted to be fixed to the oscillatory shaft 12 and an outer blade carrying section 16 pivotally mounted upon the fixed section by means of a pin 17 to allow the outer section to swing toward and from the windshield surface.

The outer section 16 is preferably formed of sheet metal and is channel shaped, as indicated at 18, with its side walls extended to form a pair of ears 19 for straddling the fixed or mounting section 14 and pivoting on pin 17. Within the channel 18 is slidably received a resilient strip 20 which constitutes an adjustable arm extension for the outer section 16 and is terminally equipped with a blade attaching part 22 for interlocking with the blade carried hook 23. The attaching part or tip 22, as illustrated in Figs. 3 and 4, is mounted for rotative adjustments by means of screw 24 and lock washer 26 upon a disc element 27 which is fixed to the outer end of the strip 20 by welding or other means. The inner end of the strip 20 is deformed as at 21 to prevent it from being entirely withdrawn from the channel.

A friction member 28, herein disclosed as a flat spring of generally bowed shape, comprises a hooked end portion 29, a substantially straight portion 31 serving as a brake shoe, and an angularly extending bowed offset portion 32 acting as a lever arm (its normal unmounted shape being shown in broken lines). This friction member is in effect a brake lever and is confined within the channel 18 by means of inwardly turned end portions 33 of the channel side walls which provide a pivotal support therefor, and in order to hold the brake shoe normally bearing upon the extensible blade carrying part 20 at a predetermined pressure a pair of inwardly bent keeper portions 34 are provided to overhang the lever arm. These portions 34 stress the resilient lever arm 32 toward the underlying part 20 for frictionally retaining the extensible section 20 in its adjusted position within the channel. The space 36 between the end portions 33 and the bottom of the channel 18 is slightly more than the combined thicknesses of the strip 20 and the spring 28 to accommodate any pivotal movement of the brake shoe about the anchorage 33.

A latch 38 is pivotally mounted on the inner section 14 and engages a shoulder 39 fixed to the outer end of the actuating shaft 12 to secure the arm on the latter.

A coil spring 37 having one end fastened to the inner end of the lever arm 32 and its other end to the latch 38, thereby urging the latch into locking engagement with shoulder 39 on the shaft, provides the necessary wiping pressure for the blade 11 upon the windshield and also act either supplementary to the lugs 34 or alone, should the latter be broken off or omitted, in maintaining the frictional engagement of the brake shoe with the extensible strip without destroying any of its other functions.

In assembling the parts the extensible section 20 is slid into the channel 18 through the opening 36 to dispose the pivoting end 29 of the brake lever 28 beneath the inturned end portions 33, as shown by broken line position 40, with the brake shoe 31 resting upon the strip 20. The resilient lever arm 32 may then be sprung downwardly into the channel 18 and thereafter the retaining lugs 34 bent thereover to hold it so stressed. In this condition the resilient lever arm 32 will assume a slightly bowed shape. Where the retaining lugs 34 are preformed the brake lever 28 may be slid outwardly a sufficient distance, as shown in broken line position 41, to allow the lever arm 32 to be sprung into the channel 18 forwardly of the inwardly bent keeper portions 34 and then slid inwardly to the full line position to underlie the latter. The coil spring 37 is then fastened to the inner end of the arm 32 and to the latch 38 whereby the latter is urged to its operative position. Because the space 36 is slightly more than the thickness of the strip 20 and spring 28, the hooked end 29 is held away from contact with the strip 20. The brake shoe 31 and the lever arm 32 may converge to form a transverse ridge, thereby providing substantially line contact with the strip 20 for holding it against accidental displacement under normal wiping conditions while permitting it to be adjusted by hand.

The angle of the wiper blade 11 may be changed with respect to the arm by backing off the screw 24 sufficiently to disengage the lock washer, turning the blade to the desired angle and then tightening the screw again.

As herein described this wiper arm is possessed of adjustments enabling it to be quickly and easily adapted to efficiently operate wiper blades on many sizes and variously shaped windshields. However, the foregoing description is merely illustrative of the inventive principles involved, which may be incorporated in other physical embodiments without departing from the spirit or scope of the invention claimed.

What is claimed is:

1. A wiper arm for windshield cleaners, comprising a shaft engaging section and a wiper blade carrying section pivotally connected thereto, the blade carrying section having a channel with an extensible blade engaging part adjustable therein, a spring leaf having its outer end portion secured in the channel and an intermediate portion seating on the blade engaging part in frictional engagement therewith, the inner end portion of the spring leaf extending angularly from the seating portion to form a resilient lever arm spaced above the blade engaging part in the channel, and means acting on the lever arm to stress the latter toward the blade engaging part and thereby cause the seating portion to exert a predetermined pressure on said part to hold the latter in a given position.

2. An adjustable wiper arm for windshield cleaners, comprising a section having a channel portion, an extensible blade carrying part disposed within said channel, a frictional member pivotally mounted at one end on the channel portion and having a brake shoe portion in the form of a transverse ridge seating on the blade carrying part, said frictional member also having a resilient lever arm extending angularly from the shoe portion for actuating the latter, and means acting on the lever arm to hold the shoe portion operative against the extensible blade carrying part whereby said part is frictionally held in its selected position.

3. An adjustable wiper arm for windshield cleaners, comprising an inner section adapted to be mounted on an actuating shaft, an outer section of substantially channeled shape pivotally mounted thereon, an extensible blade carrying part arranged within the channel, and an elongated member comprising a short arm forming a brake portion swingingly mounted at its outer end on the outer section and a long arm extending angularly from the short arm and having its outer end anchored on said outer section, said long arm being relatively more resilient than the short arm and resiliently urging the brake portion against the extensible blade carrying part to frictionally hold the same in its selected position.

4. A wiper arm having an inner mounting section and an outer blade engaging section, a latch movably carried by the inner section for engaging a shoulder on an actuating shaft, the outer section having a channeled portion, an extensible blade carrying part slidable in the channeled portion, and a brake lever pivotally connected at its outer end to the channeled portion and having an intermediate shoe portion seating upon said blade carrying part within the channeled portion, the inner end portion of the lever constituting a resilient lever arm for actuating the shoe, means acting upon the lever arm for stressing the same toward the underlying blade carrying part to assume a bowed state and thereby resiliently urge the shoe portion against said part, and a coil spring operatively connecting the lever arm to the latch whereby the latch is urged to its operative position and the lever arm is simultaneously subjected to a pull tending to increase the binding pressure of the shoe portion upon said blade carrying part for assisting in holding the latter in its adjusted position.

5. An adjustable wiper arm for windshield cleaners, comprising a section having a channel portion, an extensible blade carrying part disposed within said channel, a frictional member pivotally mounted at one end on the channel portion and having a brake shoe portion in the form of a transverse ridge seating on the blade carrying part within the channel, said frictional member also having a resilient lever arm extending angularly from the shoe portion for actuating the latter, and a keeper forming a part of a side wall of the channel and overhanging the lever arm to confine the latter under tension for holding the shoe portion operative.

6. An adjustable wiper arm for windshield cleaners, comprising a section having a channel portion, an extensible blade carrying part arranged within the channel, a resilient leaf having one extremity removably interlocking with a part of said channel portion, said leaf also having an adjacent intermediate brake portion disposed within the channel and resiliently bearing on the extensible blade carrying part for securing it in adjusted position and its other end forming a resilient brake lever portion normally projecting away from the bottom of said channel portion, and a part on a channel side wall overhanging said brake lever portion of the leaf to hold the latter under tension to thereby urge said brake portion in binding engagement with the blade carrying part.

7. An adjustable wiper arm for windshield cleaners, comprising a mounting section, a pivotally connected second section having a channeled portion, an extensible blade carrying part slidably arranged within the channel, a brake lever having one extremity removably interlocking with a part of said channel portion and an adjacent intermediate brake shoe portion disposed within the channel and bearing on the extensible blade carrying part for securing it in an adjusted position, a brake lever arm extending angularly from the brake shoe portion for actuating the latter, and resilient means engaged with the mounting section and the brake lever arm and holding the latter under stress for clampingly urging the brake shoe portion against said extensible blade carrying part and for yieldably urging the latter toward an associated windshield.

8. An adjustable wiper arm for windshield cleaners, comprising an inner mounting section, an outer section pivotally mounted thereon and having a channel portion, an extensible blade carrying part telescopically disposed within said channel, a friction member anchored at its outer end on the channel portion and having a brake shoe seating on the blade carrying part, said friction member also having a resilient lever arm extending angularly from the shoe for actuating the latter, means carried by the outer section and acting on the lever arm to hold the shoe operative against the extensible blade carrying part whereby the latter is frictionally held in its selected position, and a spring carried at one end by said lever arm and having its opposite end bearing upon the mounting section for reacting thereagainst to urge the blade carrying part toward an associated windshield.

9. An adjustable wiper arm for windshield cleaners, comprising an inner mounting section, an outer section pivotally mounted thereon and having a channel portion, an extensible blade carrying part telescopically disposed within said channel, a friction member anchored at its outer end on the channel portion and having a brake shoe seating on the blade carrying part, said friction member also having a resilient lever arm extending angularly from the shoe for actuating the latter, means on the outer section overhanging the lever arm and holding the same under tension thereby to urge the shoe against the extensible blade carrying part for maintaining the selected position of the latter, and a spring part supported by said lever arm and said mounting section and acting to urge the wiper carrying part toward an associated windshield, the blade carrying part of said outer section being swingable outwardly away from such windshield and against the urge of said spring part whereby the latter is abnormally stressed.

10. An adjustable wiper arm for windshield cleaners, comprising an inner mounting section, an outer section pivotally mounted thereon and having a channel portion, an extensible blade carrying part telescopically disposed within said channel, a friction member having a brake shoe seating on the blade carrying part in the channel portion, the side walls of the channel having parts overlying the brake shoe to retain it in position, said friction member also having an arm extending angularly from the shoe to space it above the extensible blade carrying part, the side channel walls also having other parts bent over said angularly extending arm to confine it within the channel, and a coiled spring connected at one end to said angularly extending arm and having its opposite end connected to the mounting section for reacting thereagainst to urge the blade carrying part toward an associated windshield.

11. An adjustable wiper arm for windshield cleaners, comprising a section having a channel portion, an extensible blade carrying part arranged within the channel, a leaf having one extremity interlocking with a side wall part of said channel portion, said leaf also having an adjacent intermediate brake portion disposed within the channel bearing on the extensible blade carrying part for securing it in adjusted position, the opposite end portion of the leaf adjacent the brake portion being offset away from the bottom of said channel portion, and a part on a channel side wall spaced from the first side wall part and overhanging said offset portion of the leaf to retain the same against displacement.

ERWIN C. HORTON.